United States Patent [19]

Rampuria et al.

[11] Patent Number: 4,663,743
[45] Date of Patent: May 5, 1987

[54] SEISMIC DATA TRANSCRIPTION SYSTEM

[75] Inventors: Sampat M. Rampuria, Tulsa, Okla.; Ralph E. Warmack, Kingwood, Tex.

[73] Assignee: Standard Oil Company, Chicago, Ill.

[21] Appl. No.: 525,533

[22] Filed: Aug. 22, 1983

[51] Int. Cl.$^4$ .......................... G01V 1/24; H03G 3/30
[52] U.S. Cl. ....................................... 367/68; 367/13; 367/59; 367/74; 364/421; 346/33 C
[58] Field of Search ................. 367/13, 59, 63, 68, 367/74, 67; 364/421; 346/33 WL, 33 C; 371/46, 47; 375/108

[56] References Cited

U.S. PATENT DOCUMENTS

| | | | |
|---|---|---|---|
| 3,916,370 | 10/1975 | Neely | 346/33 C |
| 3,961,306 | 6/1976 | Anstey | 346/33 C |
| 4,027,281 | 5/1977 | Greve et al. | 367/67 |
| 4,152,691 | 5/1979 | Ward | 367/77 |
| 4,257,098 | 3/1981 | Lacy | 367/74 |
| 4,316,267 | 2/1982 | Ostrander | 367/59 |
| 4,323,990 | 4/1982 | Goode et al. | 367/74 |
| 4,369,496 | 1/1983 | Parsons et al. | 346/33 MC |
| 4,393,492 | 7/1983 | Bishop | 370/55 |
| 4,408,307 | 10/1983 | Harris | 367/76 |
| 4,442,442 | 4/1984 | O'Dell | 346/136 |

FOREIGN PATENT DOCUMENTS 2080950 2/1982 United Kingdom ................. 367/74

Primary Examiner—Nelson Moskowitz
Attorney, Agent, or Firm—Timothy D. Stanley

[57] ABSTRACT

A transcriber system for receiving previously recorded data in a first medium and outputting the data in a second medium, and which includes at least one input device for receiving the data in the first medium, an output device for outputting the data in the second medium, a control and processing device which controls the input and output devices for a selected mode of transcription and in one embodiment, for selected processing of the data in the field. In one embodiment, the transcriber system receives seismic data from tape cartridges and/or solid state memory devices and outputs the seismic data onto a magnetic tape for later processing and analysis or transmission to a remote facility via a satellite link. The transcription system can include a printer/plotter for analysis of different seismic data recording and processing arrangements in the field.

11 Claims, 7 Drawing Figures

SEISMIC DATA TRANSCRIPTION SYSTEM

BACKGROUND OF THE INVENTION

1. Field of the Invention

The present invention relates to data transcription systems and, more particularly, to a data transcription system for transferring previously recorded data, such as seismic data, contained in one medium to a second medium and which has data processing capabilities.

2. Setting of the Invention

In seismic exploration, energy is imparted to the surface of the earth and the resulting energy waves travel through the earth and are reflected by subsurface interfaces. These reflected waves return to and are detected at the surface by geophones or other various vibration sensors. The output of each of these geophones is then recorded by specialized recording equipment, such as magnetic tape recorders, for later processing, plotting, and evaluation.

Often the specialized data recording equipment includes adjustable signal filtering circuitry and gain control circuitry which are adjustable by the operator prior to the recording of the seismic data. Such equipment is disclosed in U.S. patent application Ser. No. 454,405 filed Dec. 29, 1982, and which is incorporated herein by reference. The filter and gain control settings which are chosen by the operator may not be the optimum settings for a certain geological area, but this is not known until after the seismic data has been acquired, processed, plotted and analyzed. If this is the case, the geological area may have to be resurveyed at additional expense and loss of time. There exists a need for a recording device which includes processing capabilities so the operator can record a seismic trace, process it using different filter and gain settings, and evaluate the best combination of settings prior to conducting a full survey of the geological area.

Once the seismic data has been recorded, processed and plotted, sometimes it becomes apparent that one or more of the geophones or recording equipment itself are not operational or not operating within necessary specifications. In this case, the geological area may have to be resurveyed at additional expense and loss of time. There exists a need for a recording device which, in the field, detects and attempts correction of such data errors so corrective action can be taken while the survey crew is still in the geological area. Illustrative of the broad concept of data error correction in seismic operations is U.S. Pat. No. 3,496,528.

One type of data recording equipment used in seismic exploration is called a seismometer group recorder (SGR) which was developed by Amoco Production Company and covered by U.S. Pat. No. 3,806,864 (which is herein incorporated by reference) and the previously mentioned U.S. patent application Ser. No. 454,405. In an SGR, the seismic data is recorded on magnetic tape cartridges or solid state memory devices. At the end of a day's surveying, the individual cartridges are removed from the SGR's and are transcribed onto a different medium, such as 9-track magnetic tape, for processing. Or, the individual solid state memory devices are connected to a transcriber unit for outputting onto a different medium, such as 9-track magnetic tape, for processing. Thereafter the 9-track magnetic tape is transferred to a computing facility for processing. In many situations it is desirable to process, plot and evaluate the seismic data as soon as possible so any needed corrective action to the survey methods or location can be taken as rapidly as possible. However, when surveying in remote locations, this transfer of the 9-track magnetic tape to a processing facility can take several days. There exists a need for a field transcriber system capable of performing certain quality control and processing functions and transcribing seismic data from different mediums onto a second medium, and also to transfer quickly this data via radio or satellite communications link to a processing facility.

Various electronic devices have been developed for transcribing data from one medium to a second medium. One simple example of this is a cassette tape recording system where a previously recorded signal on one cassette is recorded onto a blank cassette. This system obviously does not have the desired and necessary control and processing capabilities as described above.

Other devices have been developed for transcribing previously recorded data, such as stored on punch cards, to another medium, such as magnetic tape. A device of this type is illustrated by Great Britain Pat. No. 1,356,990. Such a device, however, does not have the desired and necessary control and processing capabilities as described above.

In the art of seismic data transcription, U.S. Pat. Nos. 3,159,808 and 3,588,911 are illustrative of seismic plotting devices used to transcribe seismic data in analog form from magnetic tape storage to a plotter. These devices are used only for plotting seismic data and are not data transcription devices as contemplated by the inventors hereof and does not have the desired and necessary control and processing capabilities as described above.

SUMMARY OF THE INVENTION

A transcriber system has been developed to meet the foregoing needs and is contemplated to overcome the foregoing disadvantages. The transcriber system includes input devices for receiving data in a first medium, output devices for outputting the data in a second medium, and a control and processing device, such as a microprocessor, for controlling the input devices and the output devices for a selected mode of transcription and, in one embodiment, for selected processing of the data. In one embodiment of the present invention, previously recorded seismic data, which is stored on magnetic tape or in solid state memory devices, is transcribed onto reel-to-reel magnetic tape. Different recording parameters can be inputted nto the control and processing device so data can be processed, plotted, and analyzed in the field. Further, the present invention is capable of being placed in operative communication with a satellite communications link so stored data can be transmitted to a location for further processing and evaluation.

DETAILED DESCRIPTION OF THE PREFERRED EMBODIMENT

Figure 1:
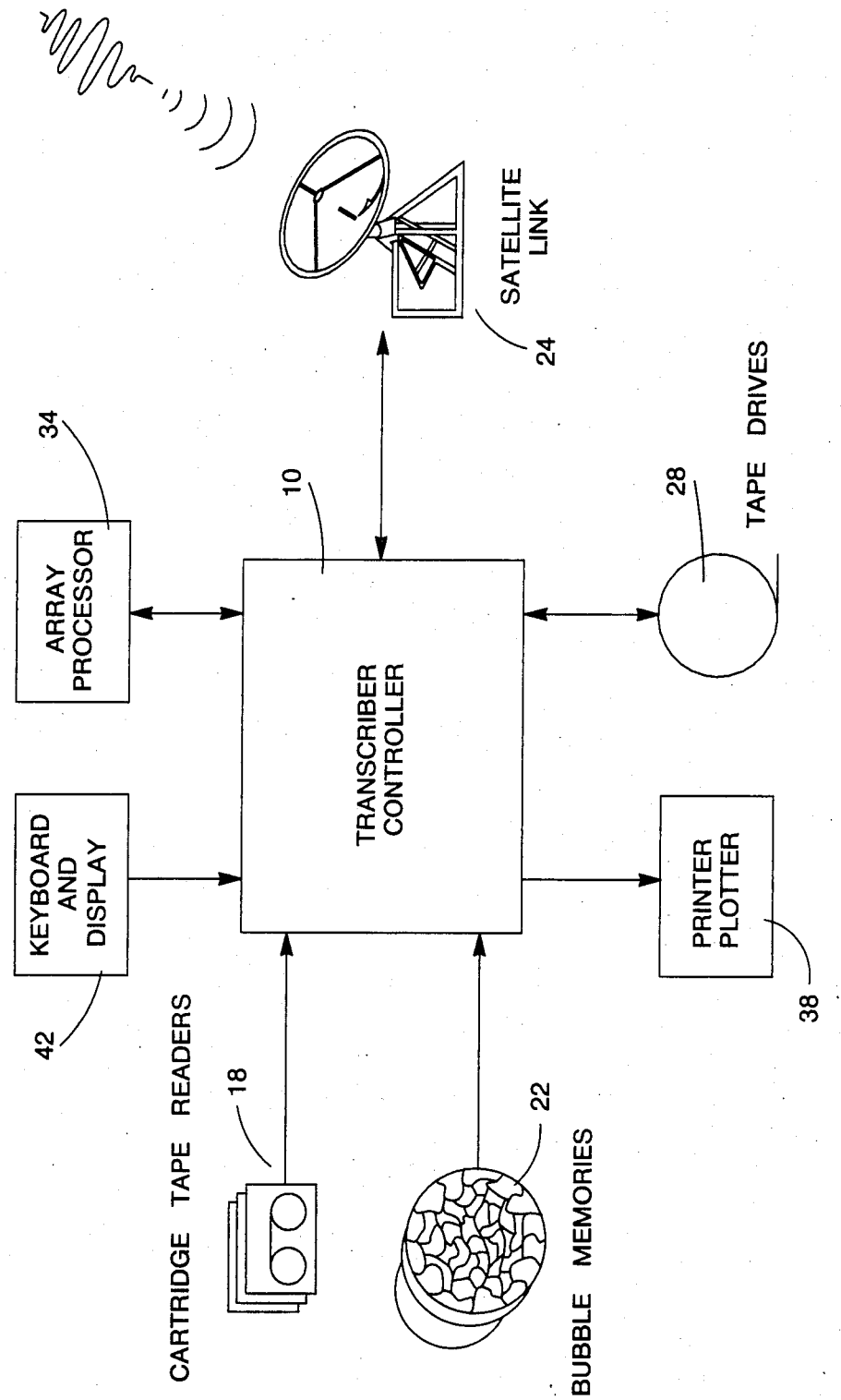
FIG. 1 is a semidiagramatic representation of the transcriber system embodying the present invention.

The present invention comprises a transcriber system which includes data input devices, data output devices, and a control and processing device, such as a microprocessor, for controlling the operation of the input devices and the output devices for a selected mode of transcription and, in one embodiment, for selected processing of the data. More particularly, the present invention is utilized for transcribing previously recorded seismic data, which is stored on magnetic tape or in solid-state memory devices, to another medium, such as magnetic tape or other similar storage devices.

The term "selected mode of transcription" as used herein shall mean transcription from several different types of first mediums to a second medium; transcription from a first medium to several different types of second mediums; transcription which includes no data processing; transcription which includes data processing; transcription using different format styles (such as common receiver, common source or common depth point transcription); and combinations of these.

While it should be understood that the present invention can be utilized in the transcription of any type of data, for the purposes of this discussion the primary use of the present invention is for transcribing seismic data which has been recorded in the field. One embodiment of the present invention can be utilized with seismometer group records (SGR's), such as the type covered by U.S. Pat. No. 3,806,864 and U.S. patent application Ser. No. 454,405 field 12/29/82. The SGR's were developed by Amoco Production Company and certain SGR's are currently marketed by GUS Manufacturing Company. Briefly, a seismometer group recorder (SGR) records the output signals from a plurality of geophones on a cartridge tape of solid-state memory device. In one embodiment, the cartridge tapes from the SGR's are removed and placed into cartridge tape readers, which are part of a transcription system, for transfer or output to a second medium, such as 9-track magnetic tape. The SGR's which do not utilize cartridge tapes but store the seismic data in solid-state memory devices, such as bubble memories and the like are called advanced SGR's or SGR IV's, are operatively connected via a cable link to the transcription system for transfer or output to a second medium after a day's acquisition.

The input devices utilized in the present invention can be at least one and usually four cartridge tape readers and/or communication control circuitry for the inputting of data from the solid-state memory devices in the SGR IV's. The output devices can be at least one and usually two magmetic tape transports, such as a half-inch 9-track magnetic tape transports or the like, and/or suitable satellite communication circuitry to send data to a satellite link for transmission to a distant facility. The control and processing device, which controls the overall operations and functions of the transcriber system, can be a microprocessor which includes software logic stored in its memory to control the operations of the transcriber system for a selected mode of transcription.

Figure 2:
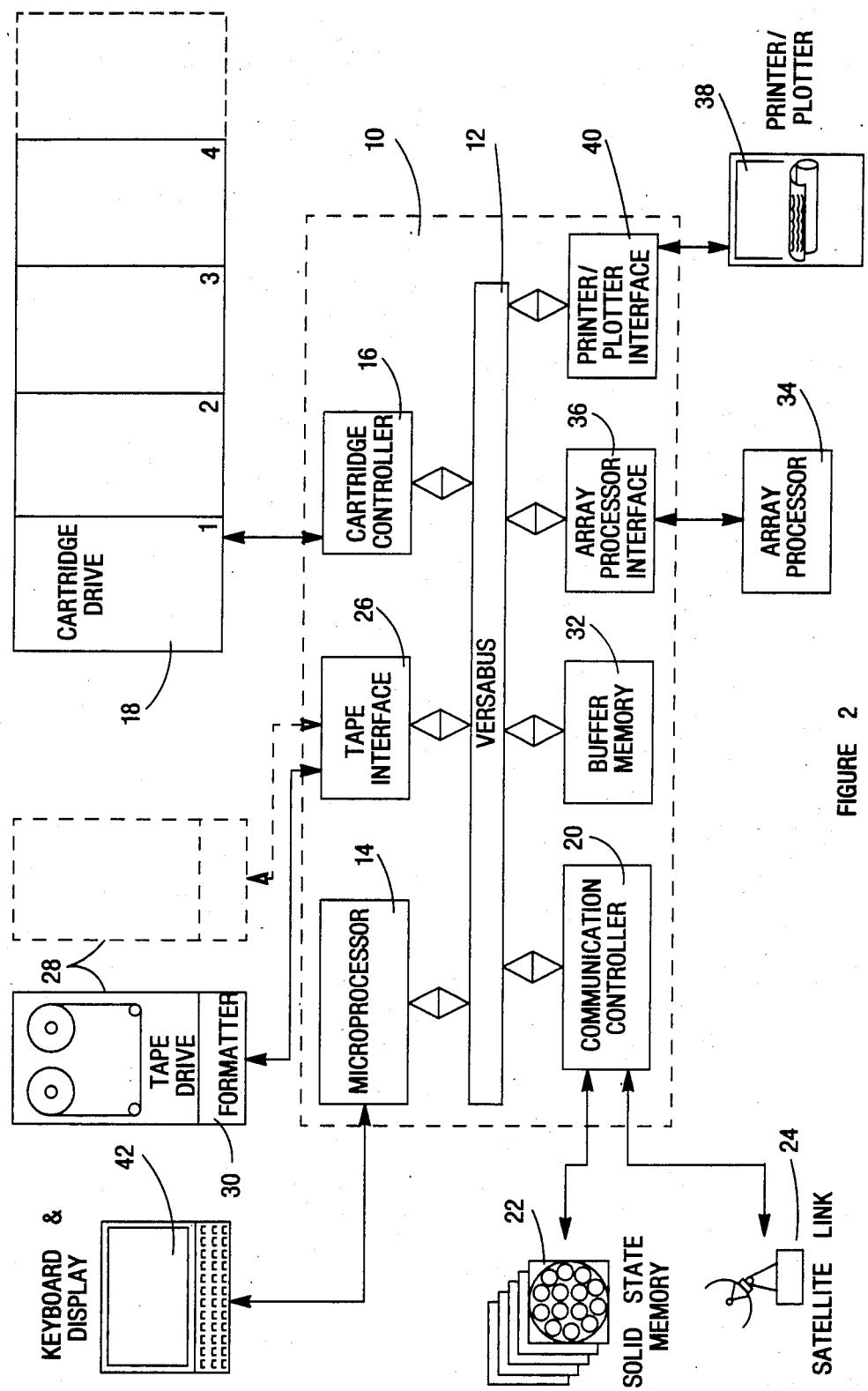
FIG. 2 is a schematic hardware layout of the transcriber system of the present invention.

One embodiment of the present invention is illustrated in FIGS. 1 and 2 and comprises an electronics housing 10 in which is mounted a master communications bus 12 into which is inserted a plurality of circuit boards. Connected to the bus 12 is a control and processing device 14, such as a microprocessor, in which is stored the software logic for the operation of the transcriber system. A cartridge reader controller 16 is connected to the bus 12 and includes a second microprocessor which is used to interface the control and processing device 14 with at least one cartridge drive 18. The cartridge controller 16 can be used to initiate the read functions of the cartridge drive 18 and can be used for data error correction, which will be described later. The cartridge controller 16 can also be used to alter the format of the data as it is read to and from different formats, such as into pulse width modulation format used in the SGR's.

A communication controller 20 is connected to the bus 12 and includes a third microprocessor used to interface the control and processing device 14 with any number of solid-state memory devices 22, such as bubble memories or the like, which are housed each within an SGR IV. The SGR IV's with solid state memory devices 22 are collected after acquisition of data and are stored on a charging truck (not shown). The charging truck includes common communication circuitry by which all of the SGR IV's are connected to a central data communication cable which is then put in communication with the communications controller 20. Further, transcribed data to be sent via a satellite link 24 to a distant processing location is passed through the communications controller 20, which within its microprocessor includes the necessary command software logic used in two-way telecommunications as is known in the telecommunications industry.

A tape interface 26 is connected to the bus 12 and includes circuitry used to interface the read and write commands of the control and processing device 14 with at least one tape transport or drive 28 through a formatter 30, used to change the format of the data from binary to a different data format, such as phase encoded (PE), for recording purposes.

A buffer memory 32 is connected to the bus 12 and includes a solid-state memory device, such as 6 megabyte memory, used to store data, such as in binary format, within the transcriber system prior to output of the data, as will be described later herein. An array processor 34 is connected through an interface 36 to the bus 12, and is used to selectively process the data using certain algorithms stored in the control and processing device 14 and using operator-selected and inputted parameters, as will be described later. A printer and/or plotter 38 can be connected through an interface 40 to the bus 12 and can be used to plot the data as seismic traces, which has been inputted from the cartridge drive(s) 18 and/or the solid-state memory devices 22, for analysis in the field by the operator, as will be described later herein.

The present invention can contain three types of input/output (I/O) controllers, such as a tape interface or controller, a cartridge reader controller, and a communication controller. These controllers have a common structure and each includes a bus interface (not shown) and a controller specific I/O section. The bus interface includes the necessary circuitry to provide access to the memory devices in the transcriber system by the control and processing device 14, access to command and status registers in the control and process device 14, and host interrupt generation. Command and data information is passed to and from these controllers through a shared system memory via the controlled processing device 14. In order to initiate Direct Memory Access (DMA) transfers with the transcriber system and to check the status of each controller, each controller responds only to certain I/O commands, such as by a command address register created by the control and processing device 14 to define a command packet address. A status register gives certain status information to the control and processing device 14 about the current operation or status of the particular controller. An interrupt command can be generated, if programmed, to indicate the completion of a command, while data to or from the controllers is transferred using DMA between the shared system memory and the controller's First-In-First-Out (FIFO's) memory. The controller's specific I/O section includes circuitry to format data for the FIFO memory, control the hardware devices, such as the tape drives and transports, and to read the status of these devices.

The stored data can be converted from its format to a different format needed for the specific I/O device, such as by serializing, the addition of parity, selective buffering or encoding and decoding of data. For example, a read/write command can be used which is initiated by the control and processing device 14 reading the status of a register to insure that the particular controller and the particular tape drive are idle. When they are idle, the control and processing device 14 creates a comman block in memory. This command block contains parameters needed by the controller, such as type of operation, address of buffer, and type of termination handshake. The address of this block is then written into the command address register of the controller. This action can cause any other operation in the controller to abort. The controller then accesses, via DMA, the command block into its on-board memory and the status register is set to "busy" and a byte in the command block is generated to show the operation is underway. When the transfer of the data is accomplished or an unrecoverable error occurs, the controller writes the termination status in the command block and changes its status register to "idle". If it is requested in the command block, the controller will generate a host interrupt at this time and if the interrupt is not selected, the control and processing device 14 will monitor the status register to detect the end of an operation. Regardless of the termination indication, the control and processing device 14 then reads the status word from the command block to determine its next action.

Figure 3:
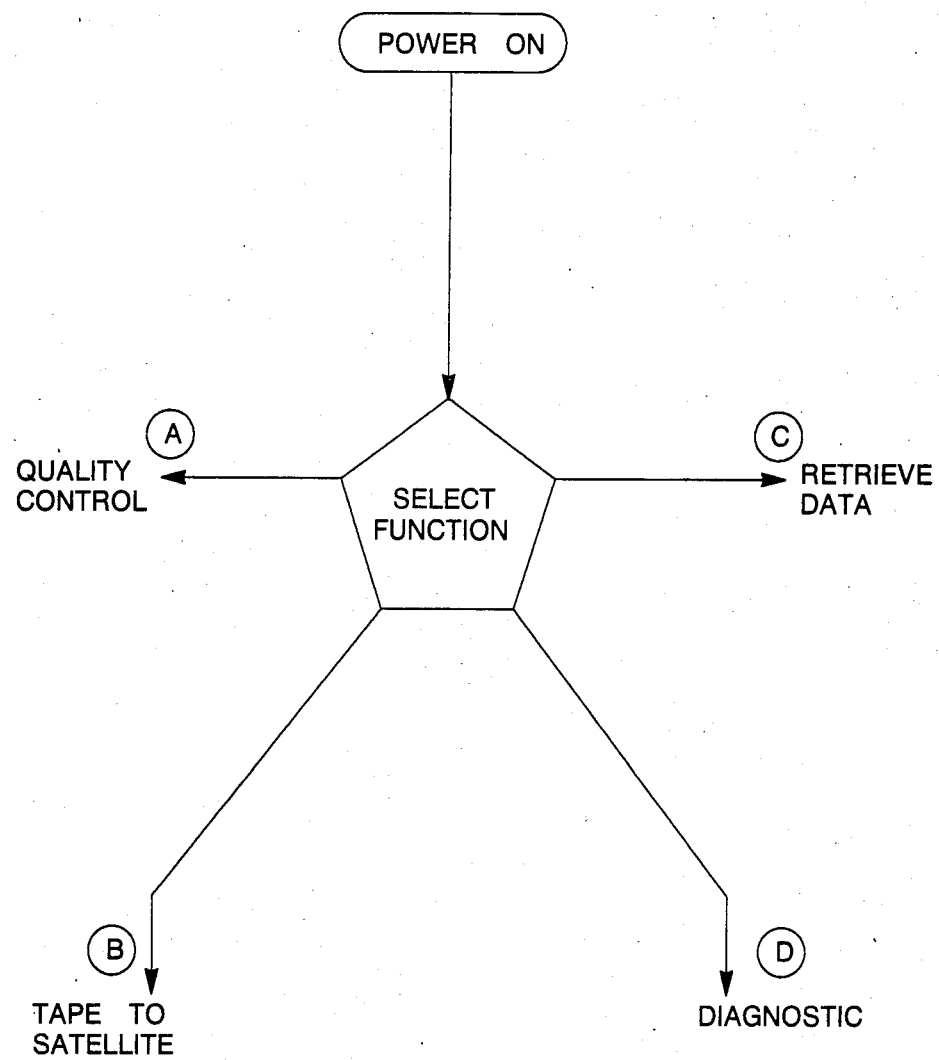
FIGS. 3-7 are the flow diagrams of one embodiment of control software used in the transcriber system.
Figure 4:
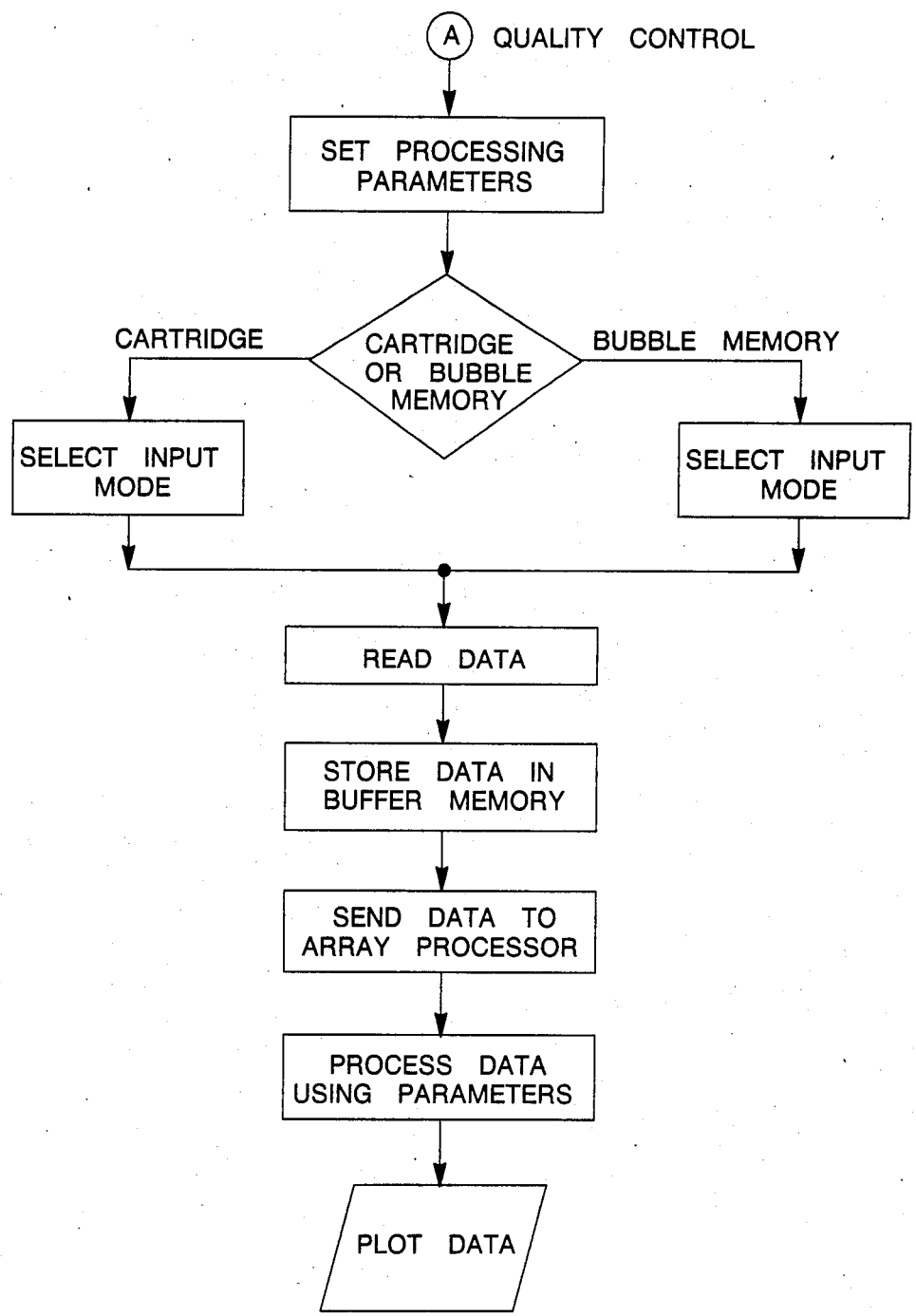

For the purposes of this discussion and to aid in understanding the capabilities of the present invention, a brief description of the software logic stored in the control and processing device 14 will follow. This discussion will be directed to one embodiment of the present invention which is mounted within a vehicle and which travels with the seismic prospecting crew. Once the vehicle has been situated in the desired location and the operator desires to activate the transcriber system, an ON/OFF switch (not shown) on a display and keyboard unit 42 is activated. Electrical power from the vehicle's battery, external generator or the like activates the transcriber system. An options menu, having the options illustrated in FIG. 3, will appear on the display unit 42 and will provide the operator with a selection of different functions. The options include: (a) quality control, where the operator can experiment with different processing parameters to find the processing parameters for future acquisition: (b) tape to satellite, where data stored in one medium, such a magnetic tape, can be transmitted to a distant facility via a satellite communication link; (c) retrieve data, where data stored in one medium is transferred to a second medium; and (d) diagnostic, where the functionality of the transcriber system can be tested.

If the quality control function (a) is selected, the operator can input via the keyboard 42 into the control and processing device 14 a series of processing parameters, such as the type of filtering and gain parameters used on seismic data, which the operator thinks will be applicable for that particular geophysical area. At that time or before hand, seismic energy is initiated, such as by a vibration device or dynamite, and the resulting traces are recorded on at least one SGR or SGR IV. If the seismic trace is recorded on a cartridge tape, then after a day's acquisition the cartridge is placed into one of the cartridge drives 18 or if the seismic trace is stored in a solid-state memory device 22 then a cable link is connected to the SGR IV and to the communication controller 20 within the transcription system. The display 42 will then request which input mode is to be used, i.e., a cartridge reader 18 or solid-state memory device 22. Thereafter, the display 42 will indicate a choice of what type of transcription or input mode is desired. Typical transcription modes include individual trace selection so that each individual trace can be processed (common depth point or common receiver) or common source transcription where all traces from one cartridge tape of solid-state memory device 22 are read and transcribed, then the next whole tape, etc.

After the transcription mode selection has been made, the control and processing device 14 commands the selected cartridge drive 18 or the selected solid-state memory device 22 to be read and the stored data is tansferred to the buffer memory 32 for temporary storage. From the buffer memory 32, the data is then sent through the array processor interface 36 to the array processor 34 for processing utilizing the different parameters inputted by the operator. The array processor 32 then processes the traces and sends them to the printer/plotter 38 while simultaneously retrieving the next trace from the buffer memory 32.

The operator can elect to view the input parameters stored as header records of the selected trace and/or the hexadecimal data itself. In this case, the operator will be asked for the type of output desired and will also be given the option of sending the output to the console display or to the printer or both. Data will then be displayed in hexadecimal format and the fields in the heaader will be labeled approrpiately.

The selected data can be filtered, correlated and plotted as desired and up to 64 traces or data sets can be plotted simultaneously. A series of different menus are used to allow the operator to modify the data (e.g., filters, correlation, etc.) and to set up various plot parameter (e.g., scale, plot window, etc.). The amount of gain to be applied to the traces can be selected by the operator or computed by the system as desired while the fixed gain allows the operator to manually select a gain factor to be applied in increments, such as about 6 dB. The computed gain is set equal to some maximum absolute value, average absolute value or the RMS value of the respective trace. The operator can also select parameters describing the desired format of the plot.

After all the plot parameters have been selected, the data is outputted on the plotter. The actual plot can be preceded by a plot header and legend and the information printed there can include general information pertaining to the recording of the data and the selected values of the plot parameters. Some of this information is constant for all data to be plotted (e.g., shot record number and plot density) while other information is specific to a given trace (e.g., station number and filters). In this latter case, a table can be used to identify each trace and its specific attributes. Following the plot header and legend, the data is plotted as requested. The traces are plotted in the same order in which they are listed in the table. Each plot is labeled by the trace from which the data was taken, and the time axis will be labeled every second. When the plot is finished, the operator is given the option of re-plotting the data with new parameters or new data with same parameters. If, after evaluation by the operator, different processing parameters are desired, then the original seismic data stored within the buffer memory 32 is reprocessed through the array processor 34 using the different processing parameters and is thereafter plotted for evaluation by the operator.

Figure 5:
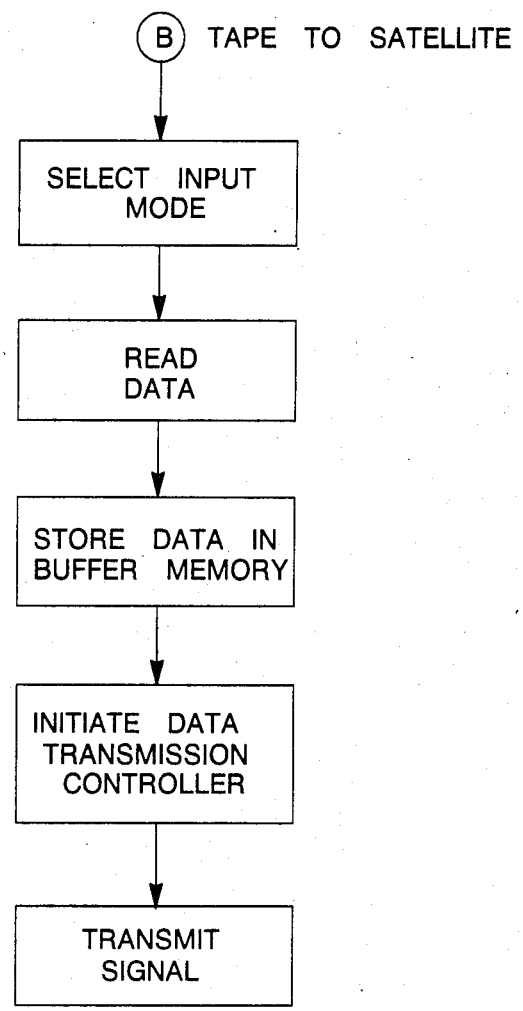

If the operator selects the option labeled tape to satellite, which is illustrated in FIG. 5, data which has been transferred to magnetic tape, as will be described below, is sent via the communication controller 20 to the satellite communication link 24 to a remote processing facility for analysis. In this option, the operator can select the desired transcription mode and the control and processing device 14 inputs the data from a selected tape drive 28 to the communication controller 20 and then to the satellite link 24 for transmission to the desired remote location.

Figure 6:
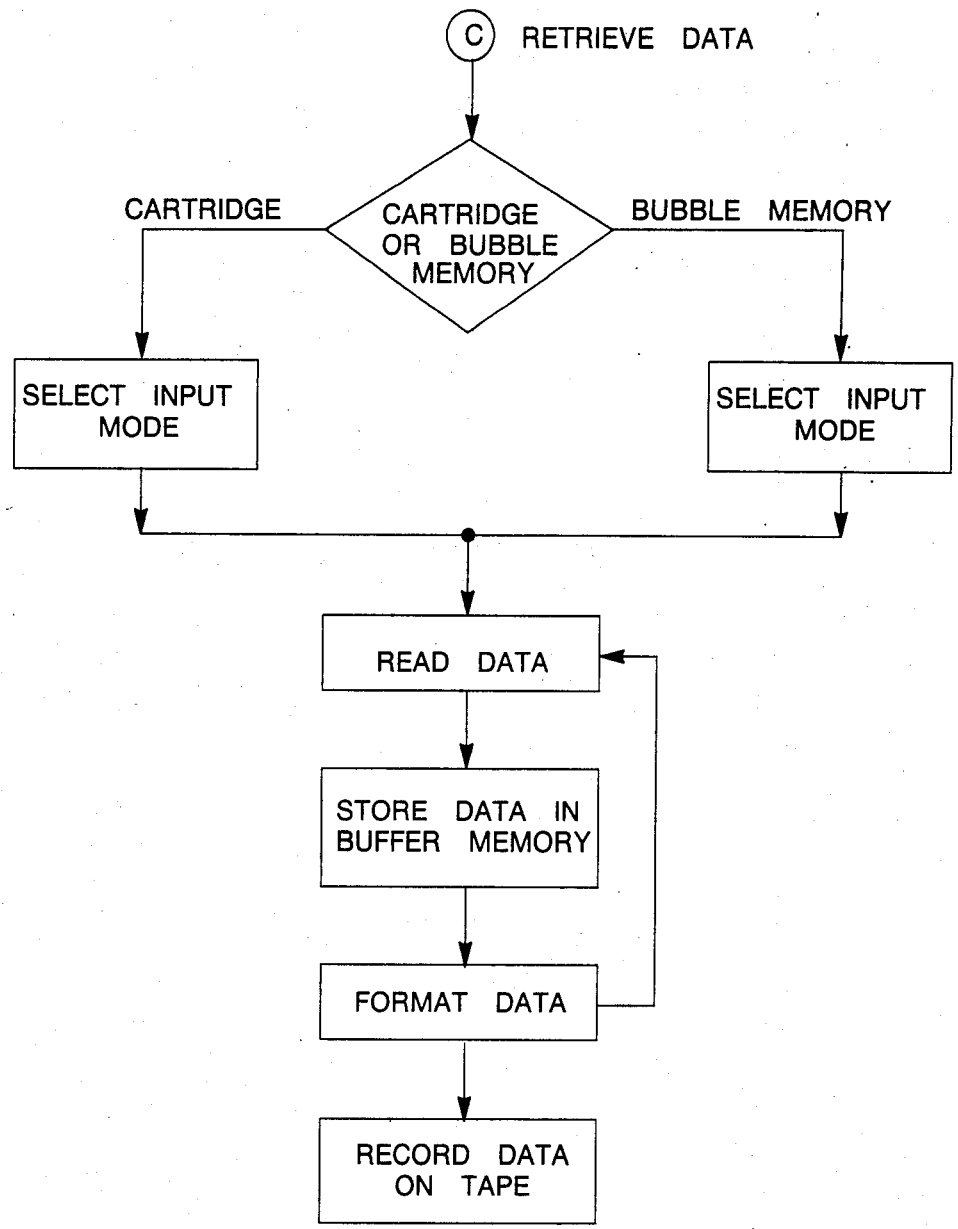

If the operator selects the option labeled retrieve data, which is illustrated in FIG. 6, previously recorded data is transferred from one medium to another. For example, after the cartridge tapes from the SGR's are loaded into the cartridge drives 18 or the SGR IV's are loaded onto the charging truck and are linked to the communication controller 20, the operator selects which data storage device is to be inputted, either cartridge tape or solid-state memory device. The transcription mode is then selected and the control and processing device 14 causes the data to be inputted or read from each cartridge tape or each solid-state memory device 22, the format is changed, and the data then is stored in the buffer memory 32. The data is then sent to the tape interface 26 and through a formatter in a tape drive 28 to be changed to a selected processing format, such as a format compatible with a mainframe computer, such as an IBM or Perkin-Elmer computer. The data is then recorded on magnetic tape on at least one of the tape transports or drive(s) 28.

Figure 7:
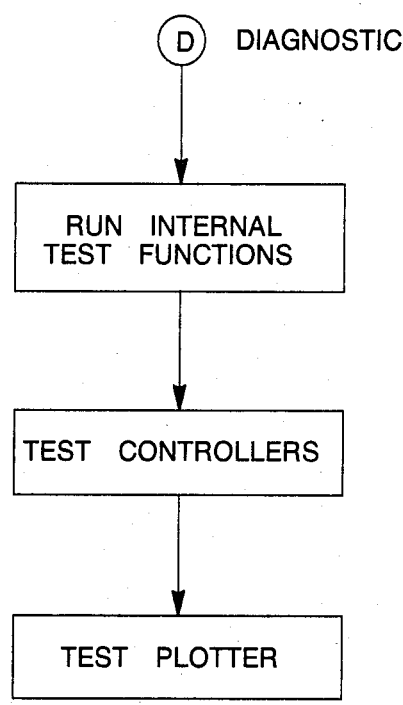

If the operator desires to evaluate the operability of the transcriber system, the operator can choose the option labeled diagnostic, which is illustrated in FIG. 7. By selection of this option, the control and processing device 14 causes certain stored internal test functions to be initiated to determine that the communication controller 20, buffer memory 32, array processor 34, and printer/plotter 38 are operable. A short seismic test signal, stored in the control and processing device 14, is sent to the array processor 34 and is processed using stored test parameters. The test signal is then sent to the printer/plotter 38 for plotting. By reviewing the plotted test signal, the operator can then determine whether or not the necessary functions of the transcriber system are operational.

One embodiment of the present invention is housed within a enclosure mounted to a 1-ton truck chassis and includes the necessary power generation and cooling equipment for the operation of the transcriber system. A cathode ray tube (CRT) and keyboard are connected to a housing which contains the control and processing device. Two Kennedy Model 9300 1600 BP tape drives and at least four DEI 3647 4-trace parallel cartridge readers are also connected to the housing. The control and processing device is a Motorola 68000 microprocessor with 64K ROM and 64K RAM and controls the operation of the transcriber system through the bus 12 by assigning address codes, about 24 bits in length, to each command signal and each seismic data "word" (usually 16 bits in length). By use of these address codes, each component is activated and deactivated and each seismic data word is routed from and to the correct location within the transcriber system through the necessary interfaces and controllers, even though all components are connected to common pins in the bus 12. The communication controller 20 includes circuitry to provide two independint high-speed serial channels capable of communicating over 16 separate communications loops at 1.5 Mbits/second data rate. One channel can select between 16 Manchester Encoder/Decoder (MED) loops, an RS 232C synchronous modem or a V.35 satellite link, while the other channel can select one of 16 MED loops. Each channel has a Signetics 2652-1 HDLC controller chip, an NSC 810 parallel I/O chip, sequence interface logic, a Manchester Encoder/Decoder, and line drivers. Also a Western Digital 2001 data encryption chip can be included for use in satellite communications for data scrambling purposes.

In this embodiment, the cartridge controller 16, communications controller 20 and the tape interface 26 include a NSC 800 Central Processing Unit (CPU), NSC 810 parallel I/O device and program memory of 2716 EPROMs. The CPU communicates with the other sections and its program memory via an internal 8 bit bus, and controls all action of the board through the I/O devices connected to the internal bus. The NSC 810 provides an interface between the internal bus and the bus 12 and all command reading and status reporting is accomplished through the NSC 810. In order to read a command block, the CPU initiates a memory access (DMA) request. The subsequent DMA transfer latches one word and is ready by the CPU through the NSC 810. Another request is initiated and continues until the clock is read. Status information is returned to memory in the same manner; i.e., one word per request. The NSC 810 also provides a timer and 128 bytes of RAM. A FIFO memory is provided for a data path between internal data paths and the bus 12. Each FIFO is 32 words long and one FIFO memory is provided for a data path between internal data paths and the bus 12. Each FIFO is 32 words long and one FIFO is used for each direction for each data path provided. This allows the accumulation of data in the FIFO to allow burst mode transfers. Each FIFO is 16 bits wide for the tape controllers and 8 bits wide for the serial communications controller.

The array processor 34 relies on the control and processing device 14 to set up command and address blocks which direct the operations of the array processor 34. These blocks are transferred via DMA into the array processor 34 which then executes the proper math functions. Data is also transferred via DMA between the system memory and the array processor 34. Among the functions performed by the array processor 34 include digital playback filtering, such as low-cut, notch and anti-alias filters, cross-correlation and computing of gain, DC offset, RMS value, etc., of the seismic traces for quality control purposes.

All of the tape drives, cartridge drives and the printer/plotter are connected to the housing in modular form, as well as the circuit boards connected to the bus 12, for ease of removal and maintenance. In one embodiment of the present invention, the cartridge readers 18 and the cartridge controller 16 are provided with circuitry and software logic for a high-speed "streaming" or input of data, which means that instead of each cartridge drive 18 having to output one trace, stop, then have the system process or record that trace and then have the cartridge restart, stop, start, stop, etc., the cartridge drive 18 can start and input all of the data into the buffer memory 32 at an operational speed which is much faster than the capability of the cartridge reader to start, stop, etc. In a typical seismic operatin there may be 200 or more caratridge tapes which need to be transcribed in a given day. Assuming that each cartridge tape is fully recorded using a 450 ft. length, it can take four cartridge readers about 150 minutes or more to transcribe 200 cartridge tapes using the old "start/stop mode" of operation at a speed of about 30 in./sec. In the streaming mode it takes less than about 100 minutes to accomplish the same task since the cartridges can be read at higher speeds in this mode. This streaming operation can reduce the transcription time by about 30% or more. In a streaming operation, the cartridge reader's drive will be operated at a speed about 45-60 in./sec and this higher speed does not present any problems as long as the cartridge drives are not frequently required to stop and start during the read operation and the servo loop and read amplifiers of the cartridge drives are modified to meet higher speed streaming requirements.

In another embodiment of the present invention, a microprocessor in the cartridge controller 16 includes logic for detecting and correcting data errors occurring on the cartridge tapes. As stated above, cartridge tapes are removed from the SGR's at the end of the acquisition process and the data transcribed onto the 9-track tape. During the transcription of the cartridge tapes it has been observed that about 10% of the cartridge tapes must be reread to retrieve all of the data. In certain operations, this number may amount to 20 or more cartridge tapes to be reread in a given day and can take 80 minutes or more to reread these tapes. These data errors are often caused by variations in the recording signal strength from the various SGR's. The data correction logic is used to automatically adjust the signal levels from the various tape readers using a pulse-width modulation scheme in which the data bits are recorded on the cartridge tape in a 4-track parallel fashion with a synchronization indicator or sync bit embedded in every fourth "bit cell" on each track. The sync cells are used to synchronize the decoder circuits and to address the 4-track parallel data bits for storage int he buffer memory. In this error recovery circuit, sync bits are used in conjunction with a gain-level detector to indicate the quality of recorded data on each track. If one or more tracks fails to indicate sync bits during a predetermined time window, the tracks with the bad sync bits will be declared illegible. The microprocessor in the cartridge controller 16 then adjusts the gain of the read amplifiers in the cartridge drive and starts monitoring the sync detector circuit for "good" sync bits. The microprocessor continues this dynamic gain adjustment until a good sync bit on that particular track is detected or the gain limit is reached. The microprocessor can also monitor the output of the read amplifier of the cartridge drive to determine the direction of change during the gain adjustment process. After good sync bits have been detected in all four tracks, the microprocessor will cause the cartridge drive to back up the tape to the start of the trace, read the good data and send it to the buffer memory and then to the tape drive. This scheme can be implemented dynamically on every record of the tape or can be performed on the first record only.

Another embodiment of the present invention is a small, portable transcriber unit used by field crews to retrieve the seismic data from the individual SGR IV's with solid-state memory devices, without the need for removing the SGR IV's from the field location. This transcriber unit includes a control and processing device, a small display and keypad 42, a miniaturized 9-track tape drive, a buffer memory 32, and a power supply, such as a battery pack.

Whereas the present invention has been described in particular relation to the drawings attached hereto, it should be understood that other and further modifications, apart from those shown or suggested herein, may be made within the scope and spirit of this invention.

We claim:

1. A transcriber system for receiving previously recorded seismic data in a first medium and outputting the seismic data in a second medium, comprising:
    (a) at least on input means for receiving seismic data in the first medium, wherein the first medium can include either solid state memory or cartridge tape and wherein the input means includes data error correction means having first circuit means for detecting sync bits within a predetermined time window of the seismic data from the input means, and second circuit means for adjusting the dynamic gain of the input means until a sync bit is detected or the maximum dynamic gain of the input means is achieved;
    (b) output means for outputting seismic data in the second medium, wherein the second medium can include nine-track magnetic tape;
    (c) mode selector means for selecting a mode of transcription of the seismic data in the first medium; and
    (d) control and processing means for controlling the input means and the output means for the selected mode of transcription.

2. The transcriber system of claim 1 wherein the output means includes a satellite communication means for transmission of the data via a satellite link.

3. The transcriber system of claim 1 and including plotting means in communication with the control and processing means for plotting the data from the first medium.

4. The transcriber system of claim 3 wherein the control and processing means includes means for selected processing of the data, whereby the processed data is plotted by the plotting means.

5. A field transcriber system for transcribing digitized multi-track seismic data form a plurality of seismometer group recorders, comprising:
    (a) input means for receiving the digitized multi-track seismic data in a first format;
    (b) output means for outputting the digitized multi-track seismic data in a second format;
    (c) control means for controlling the input means and output means;

(d) synchronizing means for synchronizing the inputting of the digitized multi-track seismic data, including means for detecting sync bits within a predetermined time window of each track of the input multi-track seismic data; and (e) adjusting means for adjusting the gain of the input means for those tracks of the digitized input multi-track seismic data in which no sync bit is detected within a predetermined time window.

6. The field transcriber of claim 5 wherein the adjusting means further includes means for adjusting the gain of the input means until a sync bit is detected by the synchronizing means on all tracks of the digitized input multi-track seismic data or the maximum gain adjustment of the input means is reached.

7. The field transcriber of claim 6 further including means for reinputting the digitized multi-track seismic data after sync bits have been detected on all tracks of the digitized multi-track seismic data to the input means.

8. The field transcriber of claim 5 further including means for selecting a second format for outputting the digitized multi-track seismic data from a plurality of second formats including common source, common receiver, and common depth point.

9. The field transcriber of claim 6 further including:
(a) processing means; and
(b) streaming means with the input means for streaming digitized multi-track seismic data from the input means to the processing means.

10. The field transcriber of claim 5 wherein four-track digitized seismic data is input and nine-track digitized seismic data is output.

11. A method of transcribing digitized seismic data from a plurality of seismometer group recorders, comprising the steps of:
(a) selecting a format for transcribing the digitized seismic data from a plurality of seismometer group recorders;
(b) reading the digitized seismic data with input means to detect sync bits within a predetermined time window of each track of the read seismic data;
(c) adjusting the gain of the input means for those tracks of the read seismic data for which no sync data was detected within a predetermined time window until a sync bit is detected or maximum gain of the input means is reached;
(d) rereading the digitized seismic data from a plurality of seismometer group recorders in accordance with the selected format of transcription; and
(e) outputting the digitized seismic data in the selected format.

* * * * *

UNITED STATES PATENT OFFICE
CERTIFICATE OF CORRECTION

PATENT NO. : 4,663,743

DATED : May 5, 1987

Page 1 of 2

INVENTOR(S) : Sampat M. Rampuria and Ralph E. Warmack

It is certified that error appears in the above-identified patent and that said Letters Patent are hereby corrected as shown below:

Column 2, line 52, "nto" should read --into--.

Column 3, line 30, "records" should read --recorders--; line 37, "of" should read --or a--; line 53, "magmetic" should read --magnetic--.

Column 5, line 26, "comman" should read --command--.

Column 6, line 27, "of" should read --or--; lines 53-54, "parameter" should read --parameters--.

Column 8, line 4, After 1600 "BP" should read --BPI--; line 44, "ready" should read --read--; line 46, "clock" should read --block--; lines 51-53, delete "memory is provided for a data path between internal data paths and the bus 12. Each FIFO is 32 words long and one FIFO".

Column 9, line 17, "operatin" should read --operation--; line 56, "int he" should read --in the--.

Claim 1, Column 10, line 29, "on" should read --one--.

Claim 5, Column 10, line 61, "form" should read --from--.

Claim 9, Column 11, line 25, Claim 9, depending on claim 6, should depend on claim 5.

UNITED STATES PATENT AND TRADEMARK OFFICE
CERTIFICATE OF CORRECTION

PATENT NO. : 4,663,743

DATED : May 5, 1987

INVENTOR(S) : Sampat M. Rampuria and Ralph E. Warmack

It is certified that error appears in the above-identified patent and that said Letters Patent is hereby corrected as shown below:

Claim 9, Column 11, line 25, Claim 9, depending on claim 6, should depend on claim 5.

Signed and Sealed this

Second Day of August, 1988

Attest:

DONALD J. QUIGG

Attesting Officer

Commissioner of Patents and Trademarks